(12) United States Patent
Balandier

(10) Patent No.: US 6,192,790 B1
(45) Date of Patent: Feb. 27, 2001

(54) ELECTRIC APPLIANCE FOR GRILLING OR HEATING A FLAT SLICE OF FOOD

(75) Inventor: Jean-Marie Balandier, Gerardmer (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/367,401

(22) PCT Filed: Feb. 10, 1998

(86) PCT No.: PCT/FR98/00253

§ 371 Date: Oct. 6, 1999

§ 102(e) Date: Oct. 6, 1999

(87) PCT Pub. No.: WO98/35597

PCT Pub. Date: Aug. 20, 1998

(30) Foreign Application Priority Data

Feb. 14, 1997 (FR) .................................................. 97 01977

(51) Int. Cl.[7] .................................................. A47J 37/08
(52) U.S. Cl. .................................. 99/390; 99/391; 99/385; 219/521; 219/537; 219/540
(58) Field of Search ............................ 99/385, 388, 390, 99/391, 393; 219/386, 527, 537, 413, 528, 540, 545

(56) References Cited

U.S. PATENT DOCUMENTS

| | | | |
|---|---|---|---|
| 2,091,041 | * 8/1937 | Hallwood | ............................ 99/391 X |
| 2,285,156 | 6/1942 | Gomersall | ............................... 99/397 |
| 3,524,404 | 8/1970 | Kimura | ................................... 99/390 |
| 4,745,855 | * 5/1988 | Younger | ................................. 99/391 |
| 4,748,308 | 5/1988 | Drews | ............................ 219/10.55 E |
| 5,487,328 | * 1/1996 | Fujii | ................................... 99/391 X |

FOREIGN PATENT DOCUMENTS

| | | |
|---|---|---|
| 1 565 043 | 1/1970 | (DE) . |
| 187 492 | 7/1986 | (EP) . |
| 276 916 | 8/1988 | (EP) . |
| US91/09106 | 6/1992 | (WO) . |
| US94/09968 | 3/1995 | (WO) . |

* cited by examiner

*Primary Examiner*—Reginald L. Alexander
(74) *Attorney, Agent, or Firm*—Browdy and Neimark

(57) ABSTRACT

Appliance for grilling a flat slice of food, the appliance being composed of a housing with a slot permitting access to a parallelepiped grilling chamber in the opposite main faces of which are respectively arranged facing each other two heating subassemblies. At least one of the subassemblies having a substantially homogeneous radiation plate heated by heating elements. The radiation face of this plate may be completed by elements which maintain a predetermined spacing of less than 1 centimeter with the slice, this face or this slice being in contact with these spacing elements along surfaces less than 1 millimeter wide. At least one of the subassemblies may be mounted to be relatively displaceable farther and closer with respect to the other in order to be applied to one side and the other of the slice with a predetermined pressure. The plates may be of a material and have dimensions such that they constitute heat storage plates for heating by convection or by radiation at a short distance.

16 Claims, 2 Drawing Sheets

ELECTRIC APPLIANCE FOR GRILLING OR HEATING A FLAT SLICE OF FOOD

This application is the national phase of international application PCT/FR98/00253 filed Feb. 10, 1998.

TECHNICAL FIELD

The present invention relates to an electric appliance for toasting or heating for a flat slice of food, notably a toaster for toasting a slice of bread simultaneously on its two faces.

PRIOR ART

The most modem toaster comprises a housing with a slot permitting access to a normally vertical parallelepiped internal toasting chamber delimited by two parallel grids opposite each other for holding the slice. Two subassemblies for heating by radiation are arranged in the housing respectively at a certain distance behind each grid. A subassembly can be constituted by one or several radiating elements associated with a reflector. A radiating element can be a sheathed electric resistance in the shape of a hair pin, or a filament at the interior of a quarts tube or a filament rolled on an insulating bar. The uniformity of toasting along a plane parallel to the grid is as much as possible achieved by the arrangement of the radiating elements, the form of the reflector and the spacing with respect to the slice. Alternatively, and as illustrated for example in the document U.S. Pat. No. 2,285,156, the subassembly can be constituted by a plate of glass or mica supporting a planar resistive wire or receiving a printed resistive pattern. The temperature of the radiating elements brought to red-hot is then of the order of 800° C. to 1100° C.

A horizontal slice-carrying carriage slides vertically in the slot along guides against one or several springs between an upper position for reception of the slice and a lowered toasting position opposite the heating subassemblies. This carriage is usually lowered manually with the aid of an external button passing through a slot of the housing, and is latched in lowered position by an electromechanical device for supplying electric power to the subassemblies. This electromechanical device is moreover linked to a setting means or to devices with sensors for temperature or color in order to liberate the carriage once the desired amount of toasting has been performed.

Simple and above all robust, this type of toaster has first of all the drawback of being rather voluminous. Moreover, the reflectors being between 10 and 15 millimeters from the radiating elements are heated equally and can transmit a party of their heat to the housing. In addition, certain subassemblies of electric resistances and reflectors produce a heating anyway which is rather unequal in the plane leaving on the slices of bread zones more toasted than others. The thermal yield between the quantity of heat theoretically necessary for toasting and that effectively furnished is then found to be rather low. Finally, certain consumers claim that internal moisture of the slice has a tendency to evaporate before the surfaces are browned and caramelized.

There are equally known, for example from the documents U.S. Pat. No. 3,524,404, EP 187 492, sandwich makers, for example, to cook a toasted cheese sandwich with ham, comprising a housing furnished with a slot opening into an internal chamber with two toasting subassemblies of which at least one is mounted to be relatively displaceable in moving away from or in approaching with respect to the other in order to come to be applied directly at one side and the other against the faces of the flat food and to grill it by conduction. These subassemblies thus delimit a toasting slot having a variable width able to be adapted to the thickness of the food to be toasted. Such sandwich makers thus comprise, in addition, a device associated with that for displacement of the carriage to advance and apply the subassembly or subassemblies against the flat food product with a certain pressure, then move them back.

A toasting subassembly is then constituted rather by a heating plate bought to a temperature lower than of the order of 250° C. For example, the plate can be of glass, or of a technical plastic such as a polyamide, or of a metal such as aluminum isolated from the rear by a polyamide layer. The heating resistance in the form of a serpentine can be drawn or silkscreen printed on the external face with a metal powder bonded or mixed with polyamide and silver flakes. The internal contact layer is then preferably covered with a food quality and non-adherent layer, such as a Teflon compound. As a variant, the document U.S. Pat. No. 2,285,156 describes a slice support constituted of two openwork plates which are articulated at their lower longitudinal edge capable of being installed between the grids delimiting the radiation toasting chamber in order to permit a main heating by conduction coming from the plates themselves overheated by the radiation, and partially by directed radiation traversing the plate openings.

These sandwich makers generally come in a manner which is more compact and operate at a temperature which is lower, thus less dangerous. However, the uniformity, the quality and the speed of toasting obtained are generally insufficient. In addition, certain consumers believe that the bread slice is then heated within to the point of loosing all flexibility and becomes rigid like melba toast.

Whether this is for toasters or sandwich makers, another shortcoming arrives from the fact that the appliance must remain connected to the electrical power mains during its use causing it to rarely be present at the dining table where its large electric power cord would be cumbersome. The appliance is then usually placed on a separate table. But then, either the consumer prepares in advance a series of pieces of toast which become cold at the moment of their ultimate consumption, or the consumer balks at the going back and forth in the morning during his breakfast. The appliance is then too often forgotten in a cupboard.

SUMMARY OF THE INVENTION

The object of the present invention is an electric radiation toasting appliance which is effective in that it toasts in a uniform manner to the desired browning of the surface of the food, and this rapidly to avoid a drying of the interior. Preferably, the appliance must be able to be made in a compact manner, and be able to function at a lower temperature in order to present fewer risks of burns and a better thermal efficiency.

Another object of the present invention is a toasting appliance which can be installed more easily on the table in order to be able to toast foods, notably bread slices, comfortably at the moment of their consumption.

According to a first aspect of the invention, the appliance for toasting a flat slice of food comprises a housing with a slot permitting access to a parallelepiped toasting chamber in the main opposed faces of which are respectively arranged facing one another two heating subassemblies, one at least of these subassemblies comprising a substantially homogeneous radiation plate heated by heating means, and noteworthy by the fact that the radiation face of this plate is completed by means for maintaining a predetermined spacing less than 1 cm with the slice, this face and/or slice being in contact with these spacing means along surfaces less than 1 millimeters wide.

For example, the appliance can comprise a horizontal parallelepiped chamber whose lower face comprises a subassembly with a radiation plate furnished with means for maintaining the spacing on which the slice rests, the upper face comprising a conventional subassembly, for example a radiation element associated with a reflector, or equally a plate for radiating from a distance.

Knowing that the intensity of radiation decreases with the square of distance, the breakthrough according to the invention consists in arranging punctiform or elongate means permitting to assure a small but very precise spacing in order to venture to bring the food very close to a homogeneous plate at high temperature from which the radiation is intrinsically uniform, and this in order to obtain a significant, regular and rapid surface toasting essentially by radiation, residual heating by conduction through the spacing means being minimized.

Preferably, the two subassemblies each comprise a radiation plate of which the radiation face is completed by means for maintaining a spacing with the slice, and at least one of these subassemblies is mounted to be relatively displaceable by withdrawing and approaching with respect to the other in order to apply one side and the other of the slice against the means for maintaining with a predetermined pressure.

An identical toasting on the two faces of the slice is thus easily obtained, without having to adjust two different subassemblies. In addition, the appliance can then be utilized either vertically or horizontally, the pressure of application of the slice against the spacing means being perfectly controlled at a predetermined value, for example, comprised between 50 to 400 N/m$^2$.

Preferably, the spacing between the slice and the radiation face is comprised between 0.1 millimeters and 6 millimeters, more particularly between 1 and 3 millimeters. This spacing is substantially less than that usually present between the slice and a subassembly for heating by radiation according to the prior art. Notably, the spacing is established at 3 millimeters for a plate brought to a temperature of the order of 500° C. or of the order of 400° C. permitting a satisfactory toasting of a slice of bread in 15 and 40 seconds, respectively, or even established at 2 millimeters for a plate brought to a temperature of the order of 400° C.

One can thus rapidly perform toasting of a satisfactory intensity with temperatures one-half or even one-third of the previous temperatures, which permits a substantial energy economy while reducing the risks of fires. Moreover, these lower temperatures also reduce heating behind the subassemblies, which permits reducing the space between the subassemblies and the plastic or metal housing. Such a more compact appliance can be placed more comfortably at the middle of a table.

Usefully, the total contact surface area of the means for maintaining the spacing with the face and/or slice is less than 15 percent of the total surface area of the radiation face, preferably less than 8 percent. Usefully, these spacing means with surfaces less than on 1 millimeters wide are spaced regularly with a value comprised between 5 and 20 millimeters. This permits minimizing in a satisfactory manner the undesired residual heating part by conduction passing through these contact surfaces and capable of leaving overtoasting marks, as well as the shadow provided by these means to the radiation heating, and this without at the same time risking penetration by these means into the food while no longer maintaining the selected spacing.

According to a first embodiment, the means for maintaining are constructed in the form of a matrix of bosses in the plate or printed in thick layers on the face according to a rectangular arrangement, in a line or network of points, these bosses being regularly spaced.

According to another embodiment, the plate is made of an assembly of longitudinal or transverse sub-plates, one of the joining edges forming an elongated spacing projection.

According to another embodiment, the means for maintaining are made in the form of a connected grid made of metal, ceramic or glass wires, if desired the wires being undulating, or made of a series of spiral springs or side-by-side, parallel, notched bars.

Thus constructed, these means for maintaining have only a weak adherence to the flat food product, are mechanically and thermally strong, and can easily be made inert to the foods.

Usefully then, the grid can be removable in order to voluntarily achieve, if need be, a conduction heating mode, for example in order to cook a toasted cheese sandwich with ham.

Preferably, one or the other of the heating subassemblies are respectively constituted by a radiation plate made of a dielectric substrate on which is silkscreened a resistive heating pattern. Thus, the toasting time for the first cycle can be substantially minimized. By an adequate shaping of the pattern, one can equally optimize the distribution of temperature and thus of toasting.

According to another aspect of the invention, the appliance for toasting a flat food slice comprising a housing with a slot permitting access to a parallelepiped toasting chamber in the main opposed faces of which are respectively arranged, face to face, two heating subassemblies comprising a substantially homogeneous heating plate heated by heating means, one at least of these subassemblies being mounted to be relatively displaceable by moving away and approaching with respect to the other in order to apply to one side and the other of the slice with a predetermined pressure, is noteworthy by the fact that the plates are of a material and have dimensions such that they constitute heat accumulation plates for heating by convection or by radiation at a short distance.

Such an appliance can then be placed at a first time on a separate table where it is connected to the power mains in order for the heating means to bring the heating plates to a high temperature, for example of the order of 500° C.; then this appliance can be disconnected in order to then be placed without its power cord at the middle of the table, the toasting being then assured by the heat stored by the accumulating plates applied against the food. Such an appliance once free standing can then be installed in an enjoyable manner on the table and permits the warm foods to be enjoyed immediately on the spot.

In practice, these accumulation plates prove to be clearly more reliable than other solutions capable of being envisioned for a free standing heating appliance, such as an appliance with a burner and a small cartridge of liquefied gas in which the presence of a flame always constitutes a danger particularly in the presence of children, or an electric battery operated appliance which would then be much more costly, heavy and cumbersome. One can equally envision a heating with a catalytic burner at a reduced temperature of the order of 500° C. to 800° C., which eliminates all risks connected with the presence of a flame. The ignition system is, however, more sophisticated and the catalytic mesh or screen is rather costly.

The thermal accumulation material can be a metal, preferably a steel coated with nickel, a stainless steel or a cast iron covered if desired with a food compatible coating, or, for a moderate temperature of the order of 300° C. possibly a dense refractory mineral stone such as that utilized for "pierrade", or even a vitroceramic.

In other words, there is chosen a material having good thermal accumulation properties per unit of volume, a material able to support the required temperature of the order of 500° C., this material also having a high thermal conductivity in order to be able to also accumulate and rapidly restore the heat. Mineral stone becomes somewhat fragile at elevated temperature and accumulates and restores its heat more slowly than metal. Vitroceramic supports high temperatures, but has a capacity and a thermal conductivity which are less than those of steel, and is costly.

After numerous laboratory tests, it has been found that an advantageous solution consists of a metal plate for each heating subassembly, this plate presenting a surface of the order of 230 millimeters by 130 millimeters as well as a thickness between 4 and 10 millimeters, preferably 6 millimeters. Preferably, the face for heating by radiation is then furnished with means for maintaining a spacing between 0.2 and 3 millimeters with the food slice.

In effect, once brought to 500° C., such a pair of plates permits toasting at least four batches of bread respectively in 15, 30, 40 and 50 seconds, which is generally sufficient for breakfast for two persons. The steel plates present notably the best relation between a large thermal capacity and a low fabrication cost. The means for maintaining spacing permit performance of a toasting preferably by radiation without risk of burning the bread while minimizing convection losses.

Usefully, the appliance can comprise a removable housing containing the toasting chamber with the heating subassemblies, this housing being capable of being placed on a base connected to the power mains and comprising connectors corresponding with connectors of the housing for automatic connection of the heating means for the plates once the housing is placed on its base. The utilization of the stand-alone appliance is thus greatly facilitated to the extent where it is sufficient to simply rest the removable housing on its base permanently installed on a separate table in order to reconnect the plates in order to again bring them to a high temperature for supplementary batches.

Usefully, the appliance comprises electromechanical or electronic means for adjustment of preliminary heating of the plates then to control toasting of the food as a function of an assigned desired toasting intensity and a sensor of effective temperature of the heating plates or a color sensor of effective browning of the slice. The user is thus agreeably freed from monitoring the progress of the toasting operation, particularly for the first rapid batches. In addition, the appliance can equally be utilized in a conventional manner when installed on its base.

BRIEF DESCRIPTION OF THE DRAWINGS

The invention will be better understood from a study of an embodiment taken by way of nonlimiting example and illustrated in the attached figures in which.

BEST MANNER OF CARRYING OUT THE INVENTION

Figure 1:
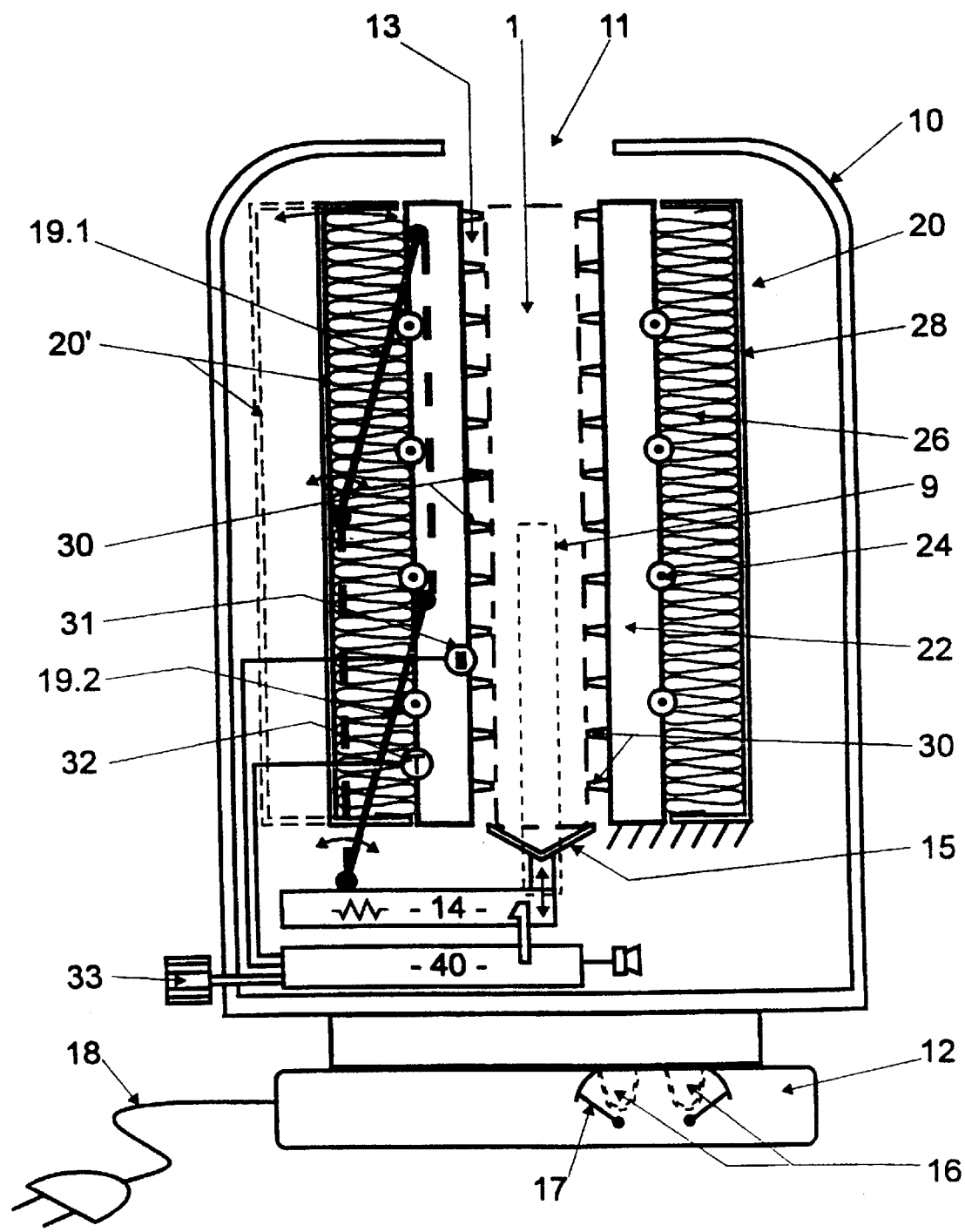
FIG. 1 is a schematic cross-sectional view of a toaster according to the invention.

The best manner of carrying out the invention is illustrated in FIG. 1, where the toaster appears from the outside in the form of a substantially parallelepiped vertical housing 10 with rounded edges fixed to a base pedestal 12, the upper face of this housing having a longitudinal median slot 11 for access to an internal central toasting chamber 13 receiving a slice of bread 1. One can equally envision a larger housing 10 having two or several parallel, side-by-side slots 11 providing access to individual identical toasting chambers 13. This housing can be made of metal or of a thermally stable rigid plastic provided with external decorations or inscriptions.

Internal toasting chamber 13 is delimited, in its two main vertical faces, in this case lateral, by two heating subassemblies homogeneous in a plane and oriented in the direction of the chamber: a right-hand subassembly fixed in the housing and a left-hand subassembly 20' movable in translation perpendicular to its plane, i.e., by moving closer and further away with respect to the fixed subassembly 20 while remaining parallel thereto. For example, and as illustrated, mobile subassembly 20' is carried at each of its two end edges by connecting rods 19.1 and 19.2 forming at one side and the other a deformable parallelogram oscillating around its equilibrium point only creating a small vertical movement. These connecting rods are synchronized angularly by a mechanism comprising for example, tooth sectors and secondary connecting rods, and the parallelograms are equally synchronized annularly by at least one longitudinal axis of rotation.

Within toasting chamber 13 is arranged a slice-carrying carriage 15 capable of being displaced by mechanical means 14 comprising an external gripping button passing through a lateral slot 9 of housing 10, and this from an upper position substantially at the middle of the chamber for reception of slice 1 to a lower position such as shown in FIG. 1 in which this slice 1 is situated opposite heating subassemblies 20, 20'. Preferably these mechanical means 14 for displacement of slice-carrying carriage 15 equally effectuate the rotation of connecting rods 19.1, 19.2 for combined displacement of the mobile subassembly 20'. Notably, these mechanical means 14 comprise one or several springs which are compressed during lowering of the carriage in such a manner that the stored energy subsequently permits raising of carriage 15 into the upper position and simultaneously moving movable subassembly 20' away once the toasting operation has been effectuated.

In this regard, these mechanical means 14 can be latched by electromechanical or electronic means 40 for control of the toasting operation. These means 40 receive on the one hand an indication of desired toasting intensity, for example, through an external button 33 acting on a potentiometer or displacing a bimetallic element, and on the other hand, information on the progress of the toasting such as information of effective browning of the face of slice 1 such as read by a color sensor 31, or effective temperature information from one of the heating subassemblies by the use of a temperature sensor 32 then combined with information of a time period given by an internal clock. Once the toasting intensity is attained, these electromechanical means 40 unlatch the mechanical means 14 thus permitting raising of carriage 15 and movement away of mobile subassembly 20', if desired accompanied by a sound signal informing the user. In a simplified version, electronic means 40 only give a visual or audible indication of completion of toasting while leaving it to the user to trigger ejection of the slice.

It is in order to note that the elastic means contained in mechanical means 14 incidentally permit mobile subassembly 20' to move more or less closer with respect to fixed subassembly 20 in a manner to adapt internal toasting chamber 13 to the thickness of bread slice 1, and in a manner to grip this slice with a predetermined pressure for a correct maintenance in its plane.

More particularly, according to a first aspect of the invention, each heating subassembly comprises a plate 22 brought to a high temperature in order to heat by radiation due to the presence of means 30 for maintaining a spacing on its radiating face. These means 30 establish the spacing between slice 1 and the facing radiating face to a well predetermined value comprised between 0.1 millimeters and 6 millimeters once the subassemblies applied to one side and the other of the slice by the mechanical means 14. Plates 22, constituting plates for homogeneous distribution of the radiation in a plane, can be metal plates of steel or aluminum, of ceramic, of glass, pyrex or vitroceramic, which are opaque or transparent. These plates can possibly be coated with decorative materials or anti-adhesive materials such as an enamel or undergo an anti-oxidation surface treatment such as a covering with nickel, chrome or aluminum.

Each one of these plates is heated at the rear by heating elements 24 which, in FIG. 1, are illustrated in the form of sheathed resistances mechanically embedded in the rear face. Alternatively, the conductive heating element can be in a sandwich of the polyamide or micanite type containing a heating resistive serpentine of metal which has been cut out or silkscreened onto an insulator.

Preferably, the subassembly is constituted by a plate of a dielectric substrate, such as a glass plate, on which is either a layer of doped tin oxide is deposited, or a resistive track based on metal powders is silkscreened; or a plate presenting on one of its faces a dielectric layer on which is silkscreened a heating resistive track. The pattern of this track is optimized to assure a good distribution of temperature, thus a uniformity of toasting. This heating rear face of plate 24 can, if desired, be thermally separated from housing 10 by a layer 26 of insulating material supported by a rear support 28.

Other variations of spacing means 30 are illustrated in FIGS. 2a to 2f, permitting, when subassemblies 20, 20' are held against bread slice 1, that the faces thereof are maintained at a desired predetermined distance from the radiating faces of plates 22.

Figure 2:
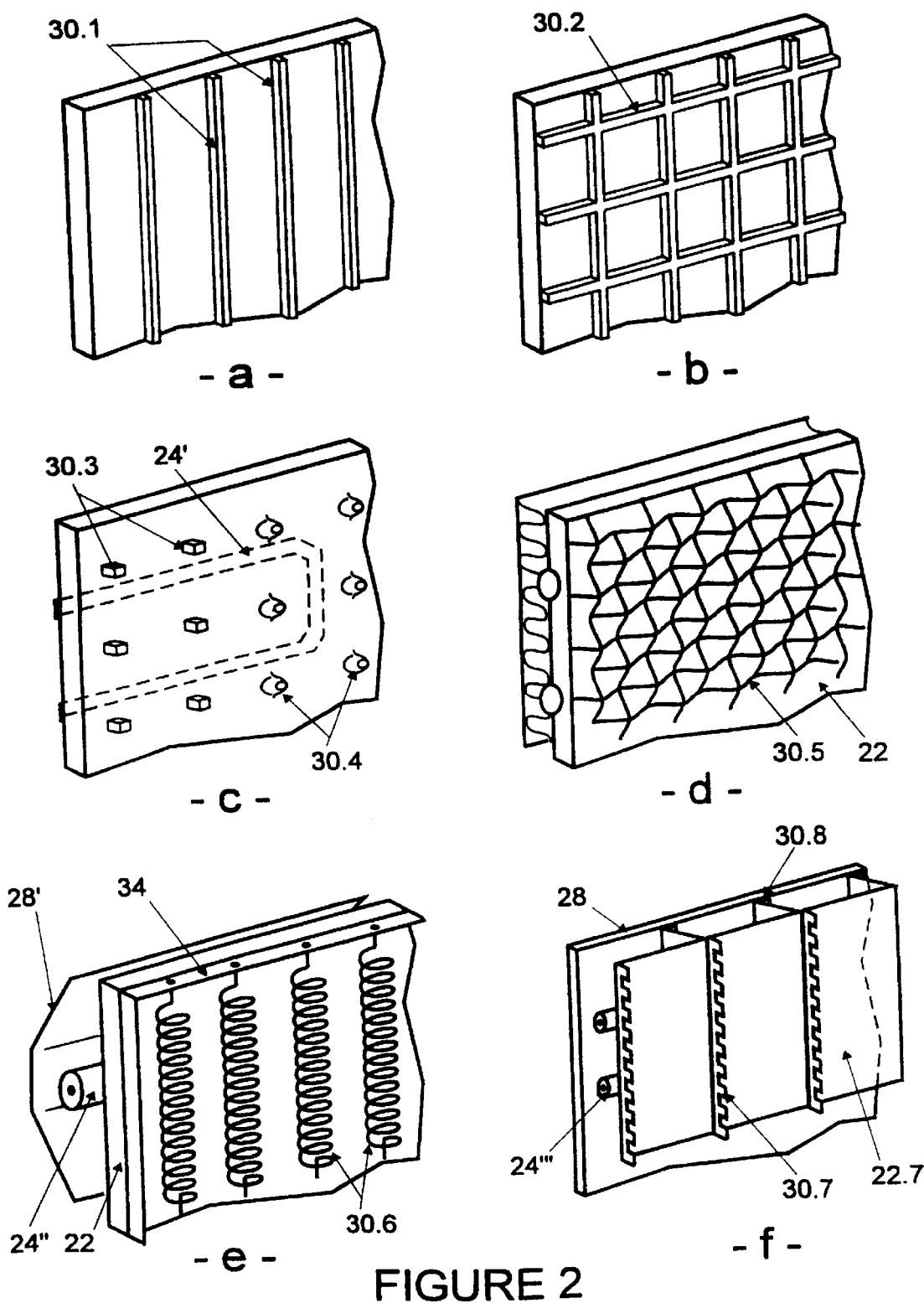
FIGS. 2a to 2f illustrate in schematic perspectives different embodiments of heating plates for close range radiation capable of being incorporated in the toaster FIG. 1.

FIG. 2a illustrates a series of straight lines 30.1, parallel side-by-side with thicknesses comprised between 0.1 millimeter and 0.5 millimeter produced by one or several superposed layers of superposed imprinted or silkscreen enamel. The width of these lines is of the order of a millimeter while their spacing is comprised between 2 and 5 millimeters.

FIG. 2b illustrates a grid pattern 30.2 formed in a manner analogous to lines 30.1 of which the sides of the meshes are equally of the order of 2 millimeters to 10 millimeters.

FIG. 2c illustrates trapezoidal bosses 30.3 or in the form of conic frusta 30.4 molded in the face of heating plate 22 during its production. The surface area at the peak of these passages is comprised between 0.5 millimeter$^2$ and 2 millimeters$^2$ for a height of between 0.5 millimeter and 2 millimeters.

This FIG. 2c also illustrates an example of silkscreened heating pads or metal pads 24' which are cut out and cemented on the rear face and pass, for example, midway between the bosses. The path can incorporate a temperature sensor constituted by a second path of which the variation of ohmic value as a function of temperature is used by a regulator. The heating path can equally have a temperature coefficient such that the plate is self-regulated itself. The plate of FIG. 2c can thus function for proximity radiation at temperatures comprised between 300° C. and 500° C.

FIG. 2d illustrates means for maintaining spacing in the form of a grid 30.5 having a low thermal inertia with meshes comprised between 5 millimeters and 10 millimeters on the side made from a stainless steel wire, a ceramic wire or a glass wire of small diameter, for example, 0.6 millimeter. Preferably, the fine wire undulates to form waves in such a manner as to give the grid a thickness of the order of 3 millimeters. If desired, this grid can be latched in a removable manner on plate 22 permitting to return eventually to a heating by conduction.

FIG. 2e illustrates spacing means made in the form of a plurality of springs 30.6 having helical turns, these springs being mounted parallel, side by side, held between two upper and lower (or lateral) supports of a frame 34 held against a heating plate 22. In this example there is equally illustrated a plate heating mode by means of an infrared tube 24' situated at a distance behind the plate and completed by a rear reflector 28' for isolating the subassembly with respect to housing 10.

FIG. 2f illustrates a heating plate constituted by the assembly of a plurality of sub-plates 22.7 of sheet metal cut and folded in such a manner as to form respectively a junction border 30.7 with saw teeth protruding toward the interior of the toasting chamber, as well as a rear tab 30.8 for assembly with a rear reflector 28', these sub-plates supporting in an insulated manner sheathed resistive elements 24'.

In one embodiment as in another, all of the spacing means 30 are characterized by their narrowness, i.e., their contact with is inferior to 1 millimeter, in order to minimize as much as possible an undesired part of heating by direct conduction and in order to leave a maximum surface for heating by radiation. However, these contact zones must be sufficiently numerous for the formation of cross that the bearing zones to be reduced to the minimum since one thus diminishes the separation force of the bread and the black traces with a sharp taste. In the preferred embodiments of FIGS. 2c to 2f, the density of the slice/plate contact surface area is comprised between 0.5 and 5 points per centimeter$^2$, for example, 1.6 points per centimeter$^2$.

Excellent results are particularly obtained with an undulating grid according to FIG. 2d formed with a stainless steel wire with a diameter of 0.5 millimeter, with a square mesh 7 millimeters on a side giving 2 points of contact per centimeter$^2$, the undulations imposing a spacing of 3 millimeters between the bread slice and the heating subassembly. The contact surface of the undulating wire on the bread is reduced and very rounded. In addition, the undulating wire allows an extraction of the bread without effort and without tearing the crust.

The appliance described previously is utilized in a conventional manner, i.e., that, after having indicated the desired toasting intensity by acting on button 33, the user places a slice of bread 1 on bread-carrying carriage 15 then acts on the external button of mechanical means 14 to lower the slice into the toasting chamber. This action simultaneously provokes the advance of mobile subassembly 20' pushing this slice with a predetermined pressure against fixed subassembly 20.

However, the presence of spacing means 30 on the heating face of plates 22 modifies this manner of toasting fundamentally. In effect, control means 40 fix the temperature of plates 22 at a value comprised between only 400° C. and 500° C. permitting toasting in a uniform manner of the corresponding faces of the bread slice, and this in a very short time of the order of 15 to 40 seconds. This time is clearly insufficient to provoke evaporation of the internal moisture of the slice. This manner of heating is thus distinguished from direct heating by conduction at lower temperatures of the order of 250° C. leading, after a long waiting period, to a slice which is toasted uniformly throughout its mass. This manner of heating is distinguished also radically from heating by radiation at a distance implying temperatures of the order of 800° C. to 1000° C. which is clearly slower to reach equilibrium thus more difficult to master.

According to another aspect of the invention, heating plates 22 have a substantial thickness, greater than 6 millimeters, even 10 millimeters, in such a manner as to constitute heat accumulation plates permitting toasting of the food in a stand-alone manner, that is without being connected to the electric mains. For example, plates 22 are of steel or of cast iron with a thickness of 6 millimeters constituting masses of around 1.5 kg each. Alternatively, these plates can be of stone, such as those utilized for "pierrades", and then have a greater thickness in order to be sufficiently heavy to constitute an adequate thermal reservoir.

Housing 10 containing heating subassemblies 20, carriage 15 with displacement mechanism 14 and control means 40 is mounted in a removable manner on its pedestal 12. For example, this pedestal presents a concave imprint in which the base of housing 10 comes to be installed in a stable manner. At the bottom of this imprint are equally arranged connectors 16, for example female, receiving corresponding male connectors of housing 10 by electrical connection. Preferably, these connectors are insulated when not connected by safety closing shutters 17, the form of these shutters being such that they are automatically displaced by the introduced male connectors.

As illustrated in FIG. 1, accumulation plates 22 are preferably completed with the spacing means described previously to force a heating of slice of bread 1 essentially by radiation.

Thus, when housing 10 is installed in its pedestal 12 and the non-illustrated switch of the pedestal is turned on to place the appliance in operation, regulating electromechanical and/or electronic means 40 supply heating elements 24 until accumulation plates 22 reach a temperature of the order of 500° C. If necessary, these means 40 restart the electric supply in order to maintain these accumulation plates hot if the appliance is still on stand by. On average, one notes that the duration of preheating of the plates to 500° C. requires around 7 minutes with heating elements having a total power equal to 2 KW, and can even be reduced to 5 minutes with heating resistances at 3 KW.

Once the family and the guests are at the table, the user can then carry housing 10 by gripping it by external insulating handles to bring it and place it at the middle of the table for toasting bread or other foods in a user-friendly manner. Due to the accumulation and heating plates 22, and in combination with the means 30 for maintaining a small spacing with the slices of bread, it is noted that a first batch is toasted very rapidly in 15 seconds at 500° C. This toasting duration increases in proportion as the plates drop in temperature, the toasting of the fifth batch taking around 90 seconds at around 330° C., a time differential of 15 seconds being added for each of the batches. If toasting of other slices of bread is envisioned, it is then sufficient for the user to reposition housing 10 on its pedestal 12 in order to initiate a reheating of the accumulation plates, this reheating being effectuated in about 2 minutes for heating resistances with a total power of the order of 3 KW.

One of the advantages of this heating by accumulation is that the plates are automatically cleaned at each increase in temperature by a pyrolytic effect. This appliance presents equally improved safety to the extent that the heating elements are not heated to red-hot. In addition, it is relatively economical to the extent that the heating elements are only activated when necessary, the heat furnished being essentially utilized during toasting and little lost by convection.

The invention is not in any way limited strictly to the embodiments described previously, but encompasses numerous modifications or improvements.

For example, the spacing means can be mounted on the heating face of plates 22 in a removable manner so as to leave the user the choice of heating by radiation or by conduction depending on the type of food involved. Then, and particularly in the case of a subassembly constituted by a plate having a dielectric substrate on which is silkscreened a resistive track, there is then provided on the new face for contacting the slice a coating of a material having non-stick properties such as a polyamide lacquer, PTFE, or enamel. The subassembly then functioning by conduction is only brought to a reduced temperature of 200–250° C.

One can equally envision that the spacing means are arranged in the form of a slice support removable by means of external insulating handles and constituted by two grids of undulating wires or springs, these grids being articulated at their longitudinal edge. Preferably then, the toaster is slightly inclined at 5 to 10° from the side of the fixed subassembly. This arrangement permits provision for the movable subassembly to come in contact against the fixed subassembly after extraction of the slice support so as to avoid the loss of heat by convection between two batches.

One can equally envision appliances having a horizontal arrangement, the food resting then already by its own weight on the spacing means of the lower heating subassembly, the upper heating subassembly being then able to be of the conventional type for radiation from a distance or equally for nearby radiation according to the invention.

In the vertical variant, one can envision that the bottom of toasting chamber 13 is in the form of a drawer permitting extraction of crumbs, or meat juices. In the horizontal variation, the lower means for maintaining spacing are then a little higher so as to also form types of channels for evacuation of juice.

POSSIBILTIES OF INDUSTRIAL APPLICATION

The invention finds it application in the technical domain of appliances for toasting or for reheating of the toaster type.

What is claimed is:

1. Appliance for grilling a flat slice of food (1) comprising a housing (10) with a slot (11) permitting access to a parallelepiped grilling chamber (13) having opposite main faces in which are respectively arranged facing each other two heating subassemblies (20, 20'), at least one of the subassemblies comprising a substantially homogeneous radiation plate (22) heated by heating means (24), characterized in that the radiation face of said plate (22) is completed by means (30) for maintaining a predetermined spacing of less than 1 centimeter with the slice, the face or the slice being in contact with said means for maintaining along surfaces less than 1 millimeter wide.

2. Appliance according to claim 1, characterized in that these two subassemblies (20, 20') each comprise a radiation plate (22) of which the radiating face is completed by said means (30) for maintaining a spacing with the slice (1), and in that at least one of the subassemblies (20') is mounted to be relatively displaceable (14, 19.1, 19.2) farther and closer with respect to the other in order to apply one side and the other of the slice against the means for maintaining.

3. Appliance according to claim 1, characterized in that the spacing maintained by the means (30) between the slice (1) and the radiating face of the plate (22) is comprised between 0.1 millimeters and 6 millimeters, preferably between 1 millimeter and 3 millimeters.

4. Appliance according to claim 1, characterized in that the spacing maintained by the means (30) between the slice and the radiation face of the plate (22) is of the order of 3 millimeters when the plate (22) is to be brought to a temperature of the order of 500° C. and of the order of 2 millimeters when the plate (22) is to be brought to a temperature of the order of 400° C.

5. Appliance according to claim 1, characterized in that the total surface area of contact of the means (30) for maintaining the spacing with the face and/or the slice is less than 15 percent of the total surface area of the radiation face of the plate (22), preferably less than 8 percent, and in that the spacing means are spaced regularly with a value comprised between 5 millimeters and 20 millimeters.

6. Appliance according to claim 1, characterized in that the means (30) for maintaining the spacing are constructed in the form of a matrix of bosses (30.3, 30.4) in the plate (22) or bosses (30.1, 30.2) printed in thick layers on the face by an arrangement of squares, lines or a network of points, these bosses being regularly spaced.

7. Appliance according to claim 1, characterized in that the heating plate (22) is constructed of an assembly of longitudinal or transverse subplates (22.7), one of the joining edges (30.7) forming a longitudinal spacing projection.

8. Appliance according to claim 1, characterized in that the means (30) for maintaining are constructed in the form of a connected grid (30.5) made of a metal, ceramic or glass wire, if desired the wires being undulating; or made of a series of spiral springs (30.6) or notched parallel side-by-side bars; this grid being able to be removable.

9. Appliance according to claim 1, characterized in that said radiation plate is made of a dielectric substrate on which is silkscreened a resistive heating track.

10. Appliance for grilling a flat slice of food (1) comprising a housing (10) with a slot (11) permitting access to a parallelepiped grilling chamber (13) having opposite main faces in which are respectively arranged facing each other two heating subassemblies (20, 20') each comprising a substantially homogeneous heating plate (22) heated by heating means (24), at least one of the subassemblies being mounted to be relatively displaceable farther and closer with respect to the other in order to be applied to one side and the other of the slice with a predetermined pressure, characterized in that the plates are of a material and have dimensions such that after the plates have been heated and the heating means has been deactivated, the plates constitute heat storage plates for heating by convection or by radiation at a short distance.

11. Appliance according to claim 10, characterized in that the material constituting at least one of the heat storage plate (22) is a metal, preferably a steel coated with nickel, a stainless steel, a cast iron if desired covered with a food compatible coating, or a dense refractory mineral stone or a vetroceramic.

12. Appliance according to claim 10, characterized in that the housing (10) containing the grilling chamber (13) with the heating subassemblies (20, 20') is removable from a pedestal (12), and in that the pedestal comprises connectors (16) for connection with connectors of the housing for automatic connection of the heating means (24) of the plates (22) when the housing is placed on the pedestal.

13. Appliance according to claim 10, characterized in that it comprises electromechanical or electronic means (40) for regulation of preliminary heating of the plates.

14. Appliance according to claim 10, characterized in that at least one of the heating plates (22) of the subassemblies (20, 20') has a thickness comprised between 4 and 10 millimeters, preferably 6 millimeters, and in that its radiation face is supplied with means (30) for maintaining a spacing.

15. Appliance according to claim 1 wherein:
at least one the subassemblies is mounted to be relatively displaceable toward and away from the other one of the subassemblies in order to apply one side and the other of the slice against the means for maintaining; and
the spacing means comprising spacing elements that are spaced apart regularly with a spacing of between 5 millimeters and 20 millimeters.

16. Appliance according to claim 1 wherein the material constituting the radiation plate is a metal, ceramic, glass, pyrex or vitroceramic.

* * * * *